US011979642B2

(12) United States Patent
Wilde et al.

(10) Patent No.: US 11,979,642 B2
(45) Date of Patent: *May 7, 2024

(54) METHOD AND SYSTEM FOR NAVIGATING AT A CLIENT DEVICE SELECTED FEATURES ON A NON-DYNAMIC IMAGE PAGE FROM AN ELASTIC VOICE CLOUD SERVER IN COMMUNICATION WITH A THIRD-PARTY SEARCH SERVICE

(71) Applicant: DISH Network L.L.C., Englewood, CO (US)

(72) Inventors: James Wilde, Denver, CO (US); Ashok Soni, Aurora, CO (US); Hawk McGinty, Englewood, CO (US); James Shuler, Englewood, CO (US); Lixing Zhang, Pittsburgh, PA (US); Michael Disante, Englewood, CO (US); Narayanan Sekhar, Englewood, CO (US); Xiaomei Sun, Englewood, CO (US); Xinhua Yang, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,856

(22) Filed: Apr. 7, 2022

(65) Prior Publication Data

US 2022/0232295 A1 Jul. 21, 2022

Related U.S. Application Data

(63) Continuation of application No. 16/655,580, filed on Oct. 17, 2019, now Pat. No. 11,317,162.

(Continued)

(51) Int. Cl.
*H04N 5/445* (2011.01)
*G06F 3/00* (2006.01)
(Continued)

(52) U.S. Cl.
CPC ..... *H04N 21/4828* (2013.01); *G06F 16/3344* (2019.01); *G06F 16/338* (2019.01);
(Continued)

(58) Field of Classification Search
CPC .......... H04N 21/2335; H04N 21/2355; H04N 21/42203; H04N 21/4828;
(Continued)

(56) References Cited

U.S. PATENT DOCUMENTS 5,774,859 A    6/1998  Houser et al.
7,086,079 B1 * 8/2006  Kunin ................. H04M 3/4938
                                              725/112
(Continued)

FOREIGN PATENT DOCUMENTS

EP    1079617 A2      2/2001
EP    2674854 A2     12/2013
KR  100865029 B1 *  10/2008 ............. G06F 16/00

OTHER PUBLICATIONS

PCT International Search Report for International Application No. PCT/US2020/046832 dated Oct. 9, 2020 (5 pages).

(Continued)

*Primary Examiner* — Gigi L Dubasky
(74) *Attorney, Agent, or Firm* — KW Law, LLP

(57) ABSTRACT

Systems, and methods are described for navigating non-dynamic pages at a client device served up from voice search requests by selecting a feature on the image page by a user request for navigating the feature viewed on the image page wherein the feature selected has an appearance of a dynamic feature when served up on the display wherein the user (Continued)

request selects a location on the image page; identifying the feature by the voice cloud server by location data of a selected location on the page; executing a feature request on a corresponding page which contains dynamic script at the voice cloud server to receive a linked page from a third-party search service; and removing dynamic scripts, at the voice cloud search server, of the linked page for serving up as an image page of the linked page at the client device.

18 Claims, 11 Drawing Sheets

Related U.S. Application Data

(60) Provisional application No. 62/906,316, filed on Sep. 26, 2019.

(51) Int. Cl.
| | | |
|---|---|---|
| *G06F 13/00* | (2006.01) | |
| *G06F 16/33* | (2019.01) | |
| *G06F 16/338* | (2019.01) | |
| *G06F 16/438* | (2019.01) | |
| *G06F 16/9032* | (2019.01) | |
| *G06F 40/205* | (2020.01) | |
| *G06F 40/30* | (2020.01) | |
| *G10L 15/18* | (2013.01) | |
| *G10L 15/22* | (2006.01) | |
| *G10L 15/30* | (2013.01) | |
| *H04N 21/258* | (2011.01) | |
| *H04N 21/4147* | (2011.01) | |
| *H04N 21/431* | (2011.01) | |
| *H04N 21/439* | (2011.01) | |
| *H04N 21/482* | (2011.01) | |
| *H04N 21/61* | (2011.01) | |
| *H04N 21/858* | (2011.01) | |

(52) U.S. Cl.
CPC ...... *G06F 16/438* (2019.01); *G06F 16/90332* (2019.01); *G06F 40/205* (2020.01); *G06F 40/30* (2020.01); *G10L 15/1815* (2013.01); *G10L 15/1822* (2013.01); *G10L 15/22* (2013.01); *G10L 15/30* (2013.01); *H04N 21/25816* (2013.01); *H04N 21/4147* (2013.01); *H04N 21/4312* (2013.01); *H04N 21/439* (2013.01); *H04N 21/4394* (2013.01); *H04N 21/4821* (2013.01); *H04N 21/6125* (2013.01); *H04N 21/8586* (2013.01); *G10L 2015/223* (2013.01)

(58) Field of Classification Search
CPC ......... H04N 21/25816; H04N 21/4147; H04N 21/4312; H04N 21/439; H04N 21/4394; H04N 21/4821; H04N 21/6125; H04N 21/8586; G10L 15/30; G10L 15/22; G10L 15/26

See application file for complete search history.

(56) References Cited

U.S. PATENT DOCUMENTS

| | | | |
|---|---|---|---|
| 8,484,025 | B1 | 7/2013 | Mengibar et al. |
| 10,418,026 | B2 | 9/2019 | Des Jardins et al. |
| 10,972,802 | B1 | 4/2021 | Wilde et al. |
| 11,303,969 | B2 | 4/2022 | Wilde et al. |
| 2002/0052746 | A1 | 5/2002 | Handelman |
| 2003/0020744 | A1 | 1/2003 | Ellis et al. |
| 2004/0260722 | A1 | 12/2004 | Allen et al. |
| 2005/0063615 | A1* | 3/2005 | Siegel ................. G06F 16/9535 707/E17.109 |
| 2005/0172319 | A1 | 8/2005 | Reichardt et al. |
| 2006/0206589 | A1* | 9/2006 | Lentini ................. G06F 15/16 709/219 |
| 2007/0130018 | A1 | 6/2007 | Nishizawa |
| 2009/0112592 | A1 | 4/2009 | Candelore |
| 2010/0198805 | A1 | 8/2010 | Choi et al. |
| 2010/0306805 | A1 | 12/2010 | Neumeier et al. |
| 2011/0208722 | A1 | 8/2011 | Hannuksela |
| 2012/0042343 | A1 | 2/2012 | Laligand et al. |
| 2012/0178457 | A1* | 7/2012 | Liao ..................... H04W 76/18 455/437 |
| 2012/0204087 | A1 | 8/2012 | Yamada |
| 2013/0290001 | A1 | 10/2013 | Yun et al. |
| 2014/0123185 | A1 | 5/2014 | Nam et al. |
| 2014/0130182 | A1 | 5/2014 | Yackanich et al. |
| 2014/0136205 | A1 | 5/2014 | Jang et al. |
| 2014/0163996 | A1 | 6/2014 | Sureka et al. |
| 2014/0181865 | A1 | 6/2014 | Koganei |
| 2014/0244263 | A1 | 8/2014 | Pontual et al. |
| 2015/0039299 | A1 | 2/2015 | Weinstein et al. |
| 2015/0134333 | A1 | 5/2015 | Sim et al. |
| 2015/0139610 | A1 | 5/2015 | Syed et al. |
| 2015/0189391 | A1 | 7/2015 | Lee et al. |
| 2015/0279360 | A1 | 10/2015 | Mengibar et al. |
| 2015/0334443 | A1 | 11/2015 | Park et al. |
| 2016/0092447 | A1 | 3/2016 | Venkataraman et al. |
| 2016/0210966 | A1 | 7/2016 | Koganei et al. |
| 2017/0256260 | A1 | 9/2017 | Jeong |
| 2018/0053506 | A1 | 2/2018 | Konuma |
| 2018/0122379 | A1 | 5/2018 | Sohn et al. |
| 2018/0167694 | A1 | 6/2018 | Kim et al. |
| 2018/0357317 | A1 | 12/2018 | Santiago |
| 2019/0199546 | A1 | 6/2019 | Ha et al. |
| 2019/0237089 | A1 | 8/2019 | Shin |
| 2019/0281366 | A1 | 9/2019 | Henderson |
| 2019/0332345 | A1 | 10/2019 | Song et al. |
| 2020/0137444 | A1 | 4/2020 | Yoo et al. |
| 2020/0168216 | A1 | 5/2020 | Heo et al. |
| 2020/0201915 | A1 | 6/2020 | Pathak et al. |
| 2020/0211543 | A1 | 7/2020 | Sahabhaumik et al. |
| 2020/0380996 | A1 | 12/2020 | Alsina et al. |

OTHER PUBLICATIONS

Written Opinion of the International Searching Committee for International Application No. PCT/US2020/046832 dated Oct. 9, 2020 (6 pages).
Office Action from the United States Patent and Trademark Office for U.S. Appl. No. 17/649,079 dated Oct. 19, 2022 (12 pages).
Office Action from the United States Patent and Trademark Office for U.S. Appl. No. 17/649,079 dated Feb. 21, 2023 (16 pages).
Office Action from the United States Patent and Trademark Office for U.S. Appl. No. 17/649,079 dated Jun. 28, 2023 (14 pages).
Office Action Response for U.S. Appl. No. 17/649,079, filed Jan. 19, 2023 with the United States Patent and Trademark Office (9 pages).
Office Action Response for U.S. Appl. No. 17/649,079, filed May 16, 2023 with the United States Patent and Trademark Office (8 pages).
Office Action Response for U.S. Appl. No. 17/649,079, filed Sep. 27, 2023 with the United States Patent and Trademark Office (9 pages).

* cited by examiner

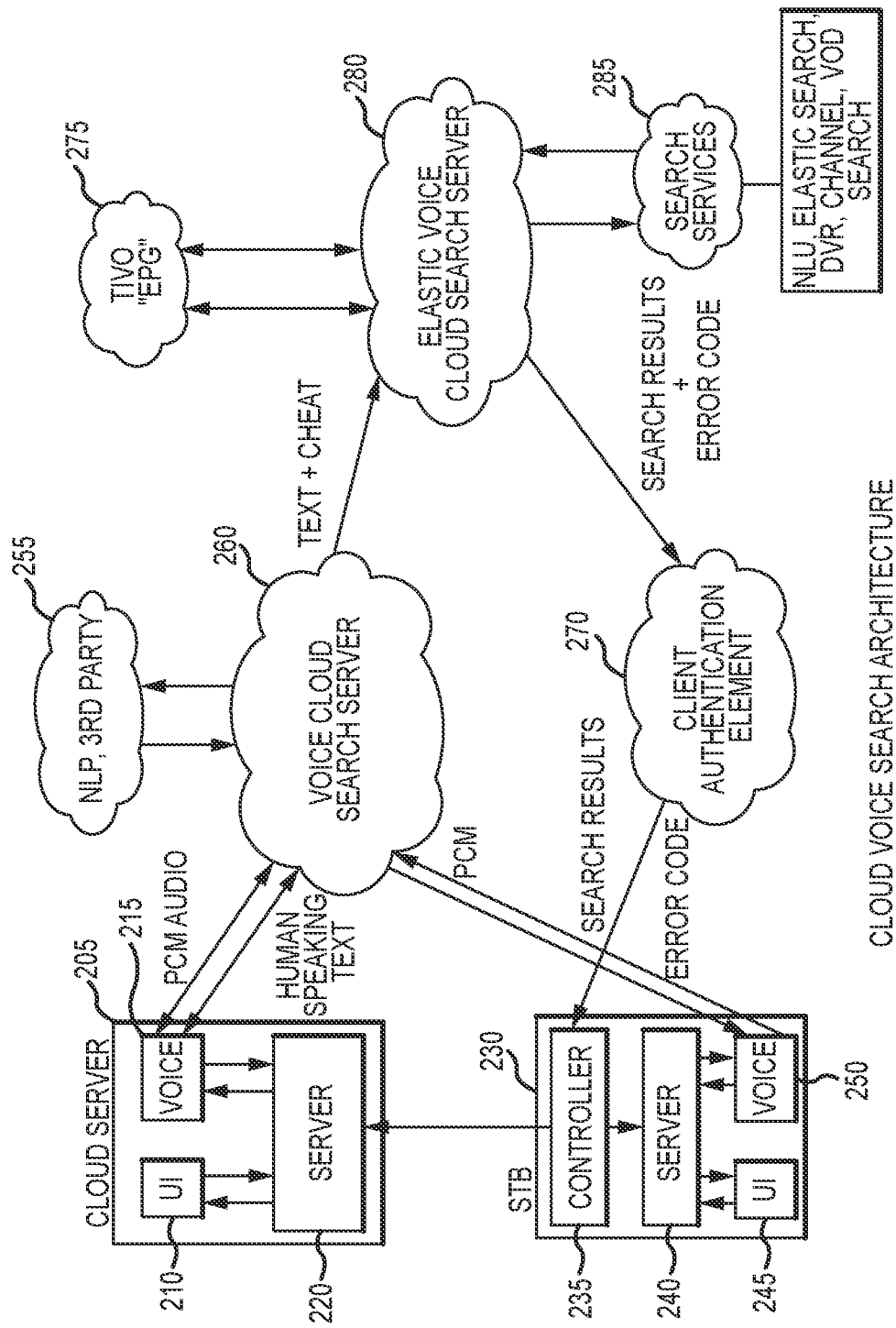

METHOD AND SYSTEM FOR NAVIGATING AT A CLIENT DEVICE SELECTED FEATURES ON A NON-DYNAMIC IMAGE PAGE FROM AN ELASTIC VOICE CLOUD SERVER IN COMMUNICATION WITH A THIRD-PARTY SEARCH SERVICE

CROSS-REFERENCES TO RELATED APPLICATIONS

This Application claims priority to U.S. patent application Ser. No. 16/655,580 filed on Oct. 17, 2019 and entitled "METHOD AND SYSTEM FOR NAVIGATING AT A CLIENT DEVICE SELECTED FEATURES ON A NON-DYNAMIC IMAGE PAGE FROM AN ELASTIC VOICE CLOUD SERVER IN COMMUNICATION WITH A THIRD-PARTY SEARCH SERVICE," and to U.S. Provisional Application No. 62/906,316 filed on Sep. 26, 2019 and entitled METHODS, SYSTEMS, AND DEVICES FOR IMPLEMENTING AN ELASTIC CLOUD BASED VOICE SEARCH UTILIZED BY SET-TOP BOX (STB) CLIENTS; and to related U.S. Non-Provisional application Ser. No. 16/655,482 filed on Oct. 17, 2020 and entitled METHODS AND SYSTEMS FOR IMPLEMENTING AN ELASTIC CLOUD BASED VOICE SEARCH UTILIZED BY SET-TOP BOX (STB) CLIENTS; and to related U.S. Non-Provisional application Ser. No. 16/655,507 filed on Oct. 17, 2019 and entitled METHODS AND SYSTEMS FOR IMPLEMENTING AN ELASTIC CLOUD BASED VOICE SEARCH USING A THIRD-PARTY SEARCH PROVIDER. Each of the foregoing applications are incorporated by reference herein.

TECHNICAL FIELD

The present disclosure generally relates to receivers and home media systems, and more particularly to methods and systems of user requests selecting and navigating features on an image page from an elastic voice cloud server without dynamic links at a client device.

BACKGROUND

There is today, available a plethora of Television programming channel data and related content from an increasingly-large number of sources. In addition to the traditional cable, direct broadcast satellite (DBS) and terrestrial television broadcast sources of television programming, many viewers now obtain their television content from video on demand (VOD) services, remote storage digital video recorders (RSDVRs), local storage digital video recorders (LSDVRs), personal video recorders (PVRs), place shifting devices, web services and/or any number of other sources.

Although these alternate sources of programming and programming-related content have given the consumer more choices and improved the viewing experience, the sheer number of programming and programming-related content can be sometimes not only overwhelming to some viewers but can prove difficult to navigate, to discover, and retrieve suitable content. That is, the conventional process of selecting different sources and channel surfing via a remote device connected to the set-top box can at the very least be challenging, time-consuming, and frustrating to the user when trying to locate and access a particular program from one of the plethora of sources that may be available. This is because the conventional method of channel surfing requires the user to select a particular source and channel surf through an electronic program guide (EPG) to find the program or channel of interest. Hence, even though EPGs can be helpful to the user as providing a framework and organization of channels and programs, the actual act of page-by-page surfing channels and programs in the EPG is still time-consuming and often can lead to the user missing relevant content. Further, most current guides are limited in the number of sources they can consider and accessing and locating content, thereby limiting their usefulness to the viewer.

It is therefore desirable to create systems and methods using voice to text cloud server services that receive user voice communications via a STB and communicate to an elastic voice cloud search service for efficiently and effectively identifying and accessing channel data, program data, and content from multiple sources without the viewer having to navigate each content source made available to the viewer manually.

These and other desirable features and characteristics will become apparent from the subsequent detailed description and the appended claims, taken in conjunction with the accompanying drawings and this background section.

BRIEF SUMMARY

Systems, and methods are described to provide a content-focused television receiver that allows viewers to use cloud-based voice searching for voice to text cloud server services that receive user voice communications via a client device and communicate to an elastic voice cloud service for navigating features on an image page without dynamic links at the client device.

In an exemplary embodiment, a method for navigating non-dynamic pages at a set-top box (STB) served up from voice search requests in an elastic cloud environment is provided. The method includes: in response a user voice request of a voice search transmitted by the STB to a voice cloud search server wherein the user voice request includes at least one set of a plurality of pulse-code modulation (PCM) audio packets, receiving at least one image page served up in a display in communication with the STB for viewing wherein the image page does not contain dynamic scripts, selecting a feature on the image page by a user request at the STB for navigating the feature viewed on the image page wherein the user request is sent to the voice cloud search server wherein the feature selected has an appearance of a dynamic feature when served up on the display wherein the user request includes selecting a location on the image page; identifying the feature by the voice cloud search server by location data of a selected location on the page from the user request; executing a feature request on a corresponding page which contains dynamic script at the voice cloud search server to receive a linked page from a third-party search service; removing dynamic scripts, at the voice cloud search server, of the linked page for serving up as an image page of the linked page at the STB; and returning, by the voice cloud server, the image page of the linked page with one or more error codes for serving up in the display at the STB.

In various exemplary embodiments, the method further including: receiving the linked page at the voice cloud search server by transmitting the feature request by the voice cloud search server to the third-party search service. The method further including: converting the linked page received from the third-party search service to an image page by stripping dynamic scripts contained in the linked page wherein the dynamic scripts includes at least hypertext links contained in the linked page. The method further including: instructing the voice cloud search server to wait for an affirmative or a declination to each feature request sent to the third-party search service. The method further including: in response to the declination to a particular feature request, sending one or more additional related feature requests to the third-party search service in an attempt to receive related search results for serving up image pages at the STB. The method further including: in response to the declination to the particular feature request sending a particular error code to the STB. The method further including: authenticating the STB for receipt of the image page from the third-party search service prior to serving up the image page at the STB. The image page is an HTML page without hypertext links.

In another exemplary embodiment, a system to navigate image pages served up from voice search requests in an elastic cloud environment, the system including: a client device; and at least one server configured as an elastic cloud server for voice to text searching of requests from a client across and communicatively coupled to the client over a network, and the server configured to: in response a user voice request of a voice search transmitted from the client device to the elastic cloud server wherein the user voice request includes at least one set of a plurality of pulse-code modulation (PCM) audio packets, receiving at least one image page served up in a display of the client device wherein the image page is a non-dynamic page; receive a feature on the image page by a user request at the client device to navigate the feature on the image page by the user request sent to the elastic cloud server wherein a feature selected has an appearance of a dynamic feature when served up on the display and the user request selects a location on the image page; identify the feature by the elastic cloud server by location data of a selected location on the page from the user request; execute a feature request on a corresponding page which contains dynamic script at the elastic cloud server to receive a linked page from a third-party search service; remove dynamic scripts, at the elastic cloud server, in the linked page to serve up as an image page of the linked page at the client device; and return, by the elastic cloud server, the image page of the linked page with one or more error codes to serve up in the display of the client device.

In various exemplary embodiments, the system further including: receive the linked page at the elastic cloud server from a transmission of the feature request by the voice cloud search server to the third-party search service. The system further including: convert the linked page from the third-party search service to an image page by stripping dynamic scripts contained in the linked page wherein the dynamic scripts include at least hypertext links contained in the linked page. The system further includes: instructing the elastic cloud server to wait for an affirm response or a decline response to each feature request sent to the third-party search service. The system further includes: in response to the decline response to a particular feature request, send one or more related feature requests to the third-party search service in an attempt to receive related search results to serve up a relevant image page to the client device. The system further includes: in response to the decline response to the particular feature request send a particular error code to the client device. The system further includes: authenticating the client device for receipt of the image page from the third-party search service prior the image page sent to the client device. The image page is a HyperText Markup Language (HTML) page without hypertext links.

In yet another exemplary embodiment, a method for implementing an elastic cloud voice search, the method carried-out utilizing at least one server in communication with a client device to receive user requests and having access to a third-party search service for querying information related to converted sets of text from the voice requests is provided. The method including: at the server, receiving user requests which include feature requests corresponding to non-dynamic links on an image page; at the server, creating cloud search threads for sending the user requests to at least the third-party search service; at the server, generating one or more sets of results from the third-party search service wherein the set of results includes image pages navigated by dynamic links from a set of corresponding dynamic pages to each image including the feature requests; in response to a generated set of results from the third-party search service, at the server sorting one or more of result sets from the third-party search service into lists of links based on the user requests; and at the server, implementing a set of rules for assembling a resultant sorted list of links into actions for insertion into a user request list for sending to a requester wherein the actions are constructed into action blocks for insertion into the user request list.

The method further including: receiving a linked page at the server from a transmission of a particular feature request by the server to the third-party search service. The method further including: converting the linked page at the server received from the third-party search service to an image page by stripping dynamic scripts contained in the linked page wherein the dynamic scripts include at least hypertext links contained in the linked page. The system further including: instructing the server to wait for an affirm response or a decline response to each feature request from the image page sent to the third-party search service wherein the image page is an HTML page without hypertext links.

Additional embodiments could provide other systems, devices, remote devices, media players, software programs, encoders, processes, methods, and/or the like that perform these or other functions. Various embodiments, aspects, and features are described in detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an example elastic cloud voice system for converting voice to text and search and performing an elastic search for a relevant channel, program and content data in response to voice input from the user;

FIG. 2 is a block diagram of an example elastic cloud voice system for converting voice to text and search and performing an elastic search for a relevant channel, program and content data in response to voice input from the user;

Figure 4A:
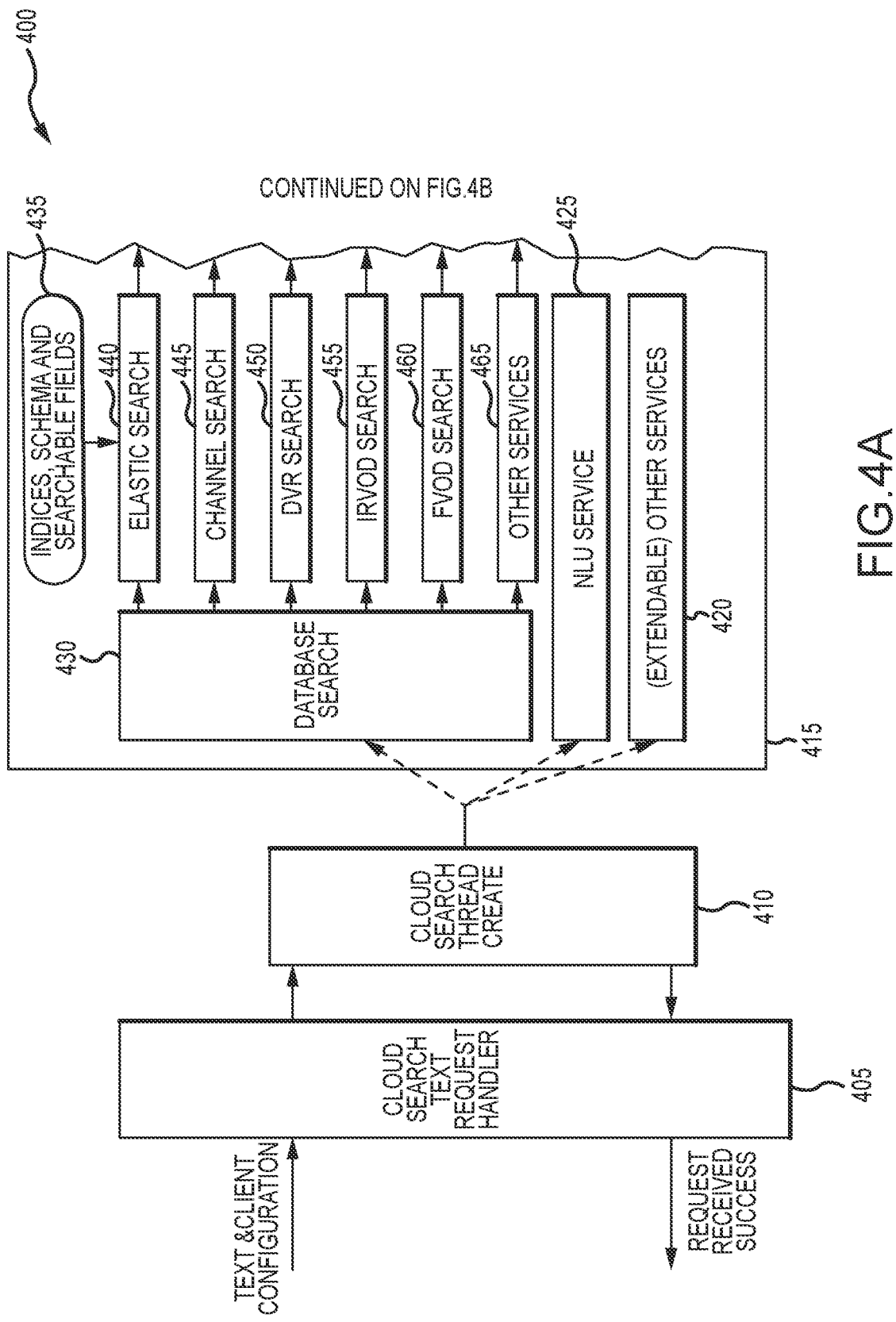
Figure 4B:
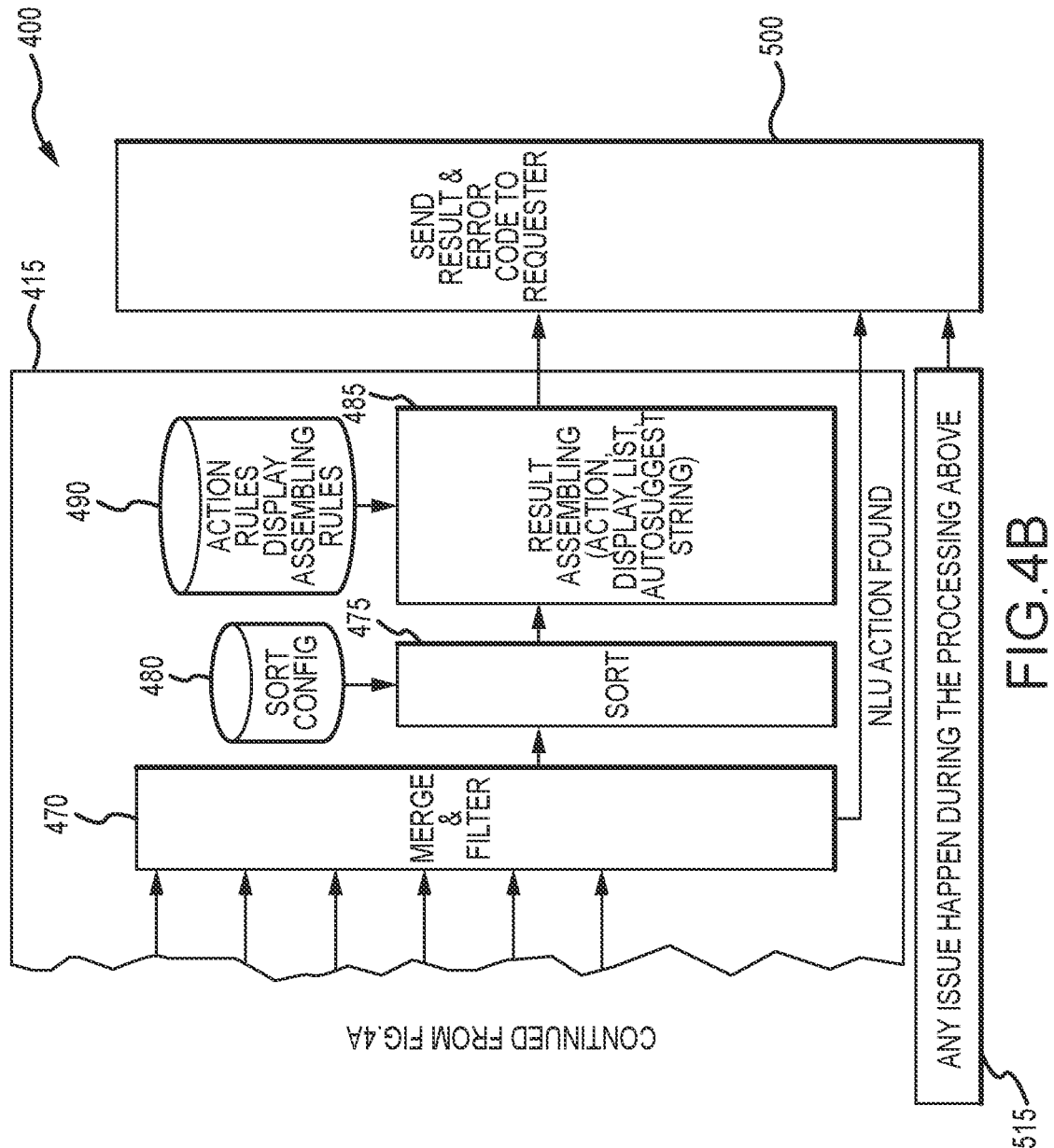
Figure 5:
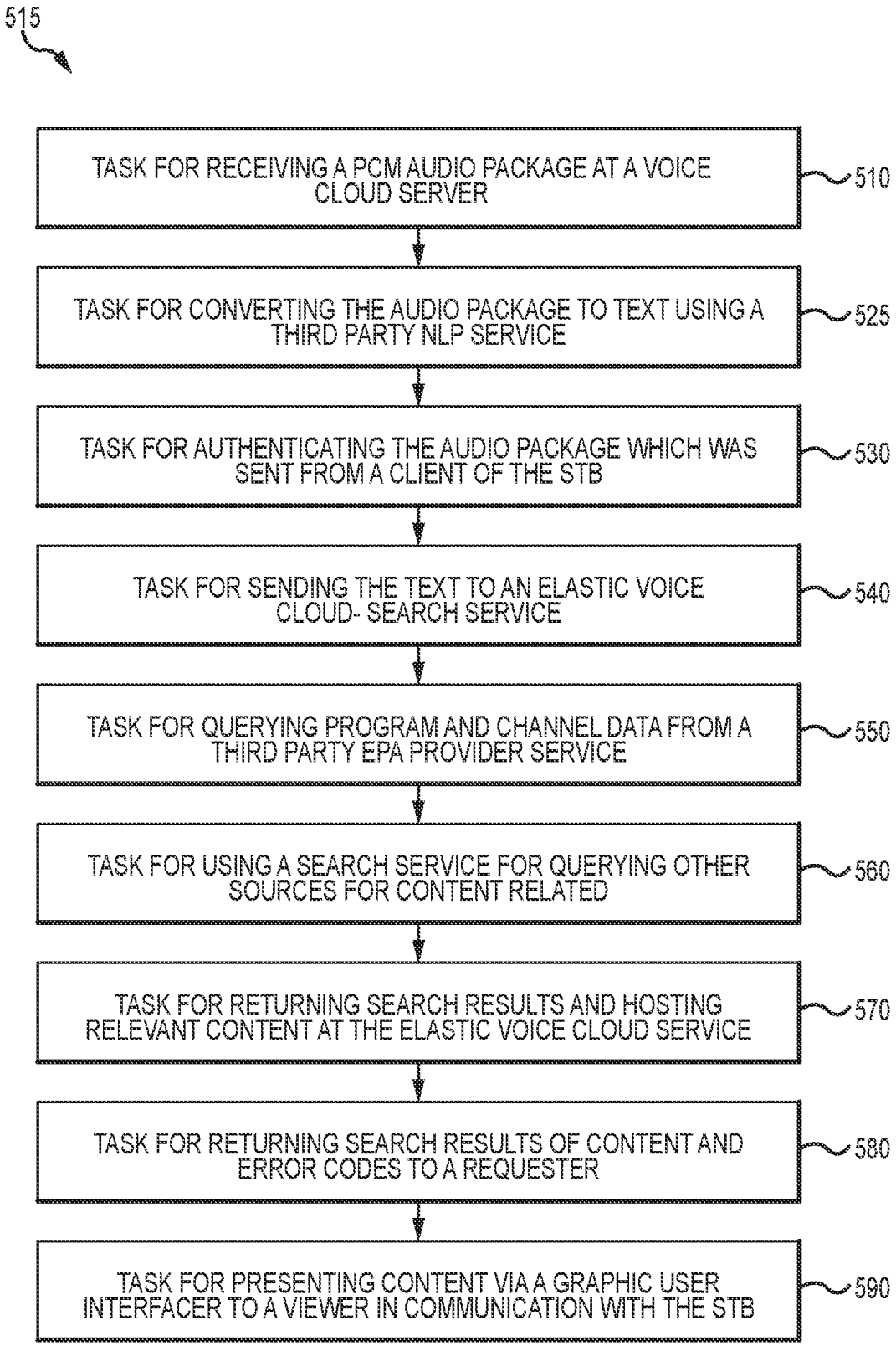
Figure 6:
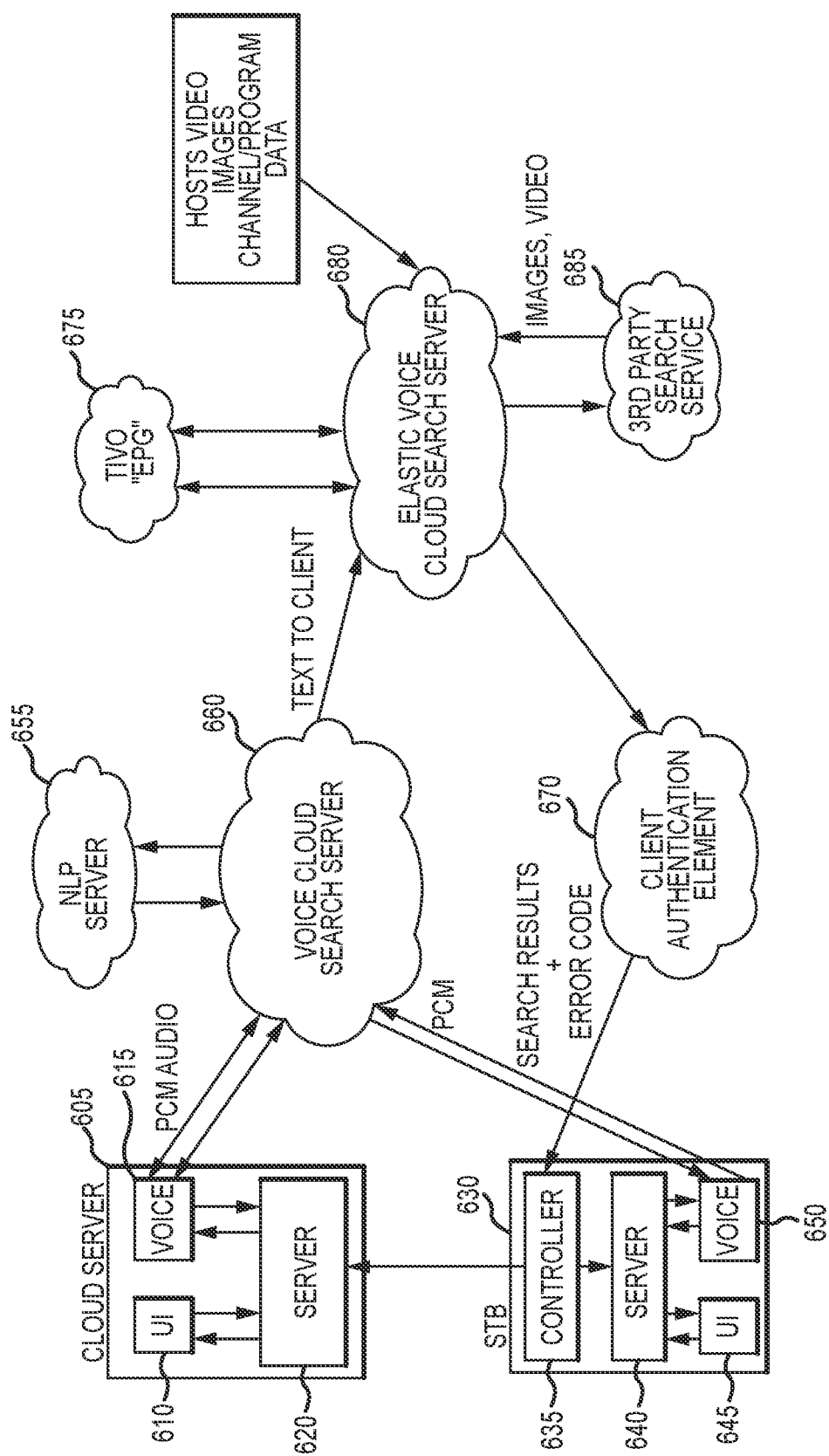
Figure 7:
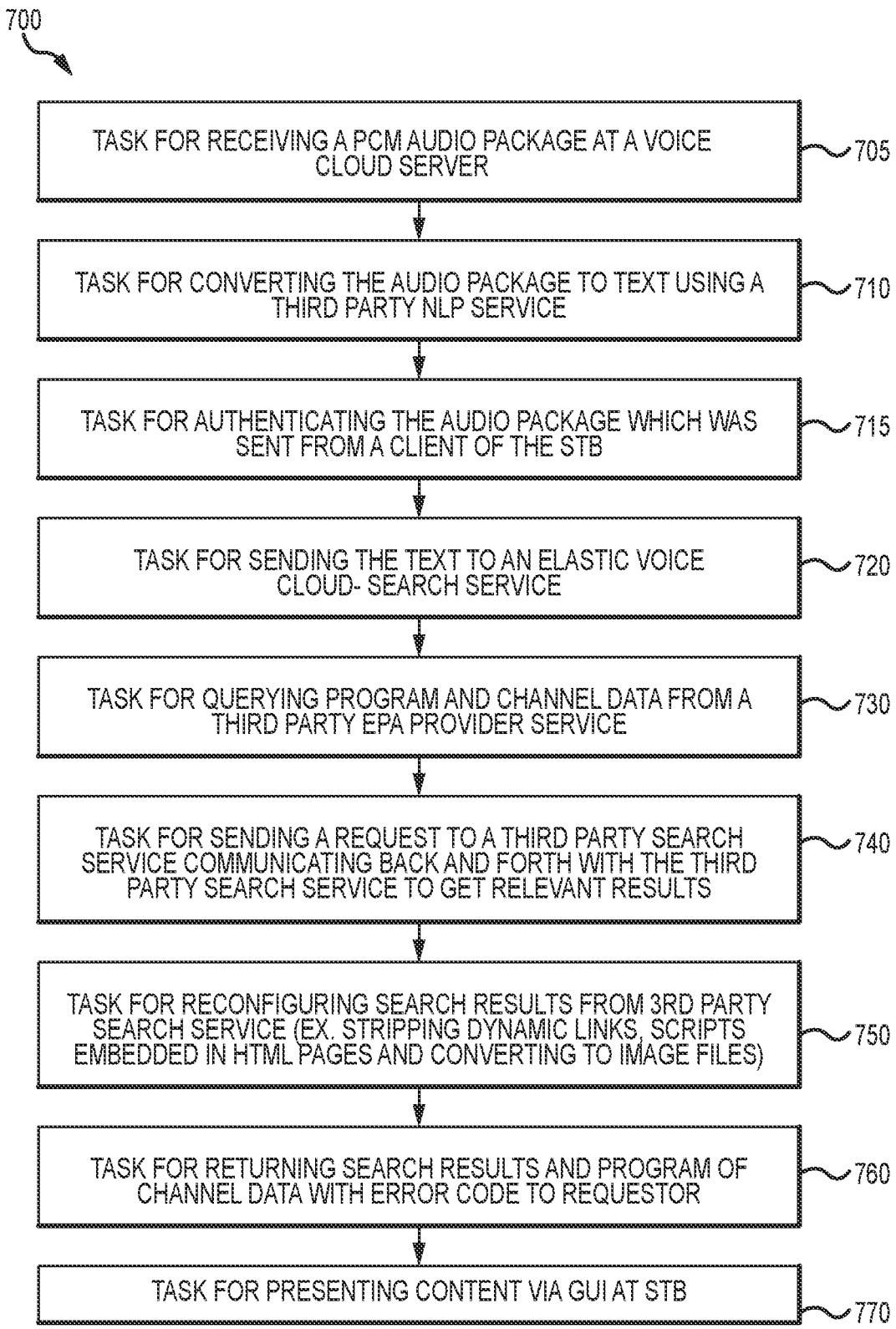
Figure 8:
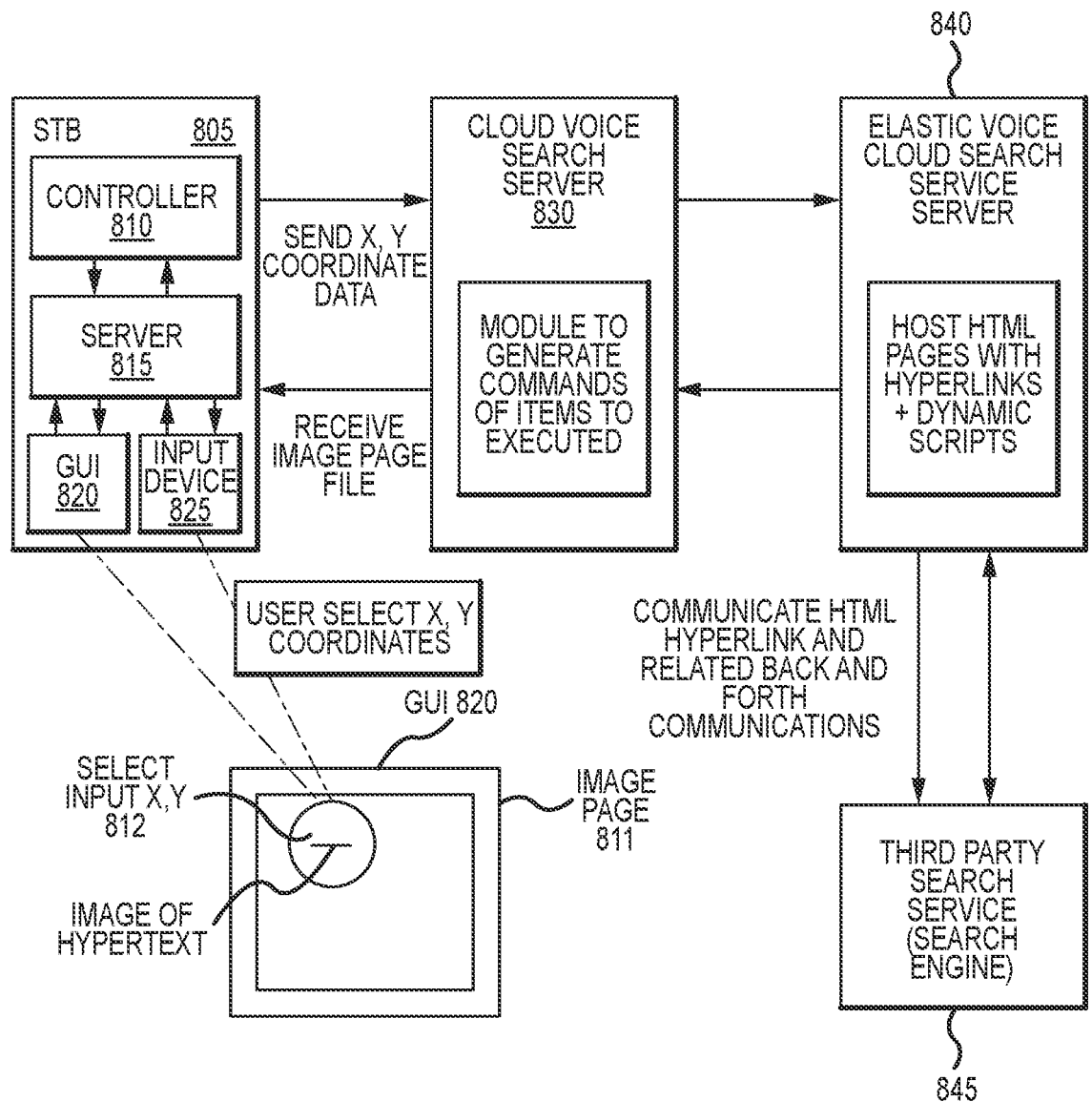
Figure 9:
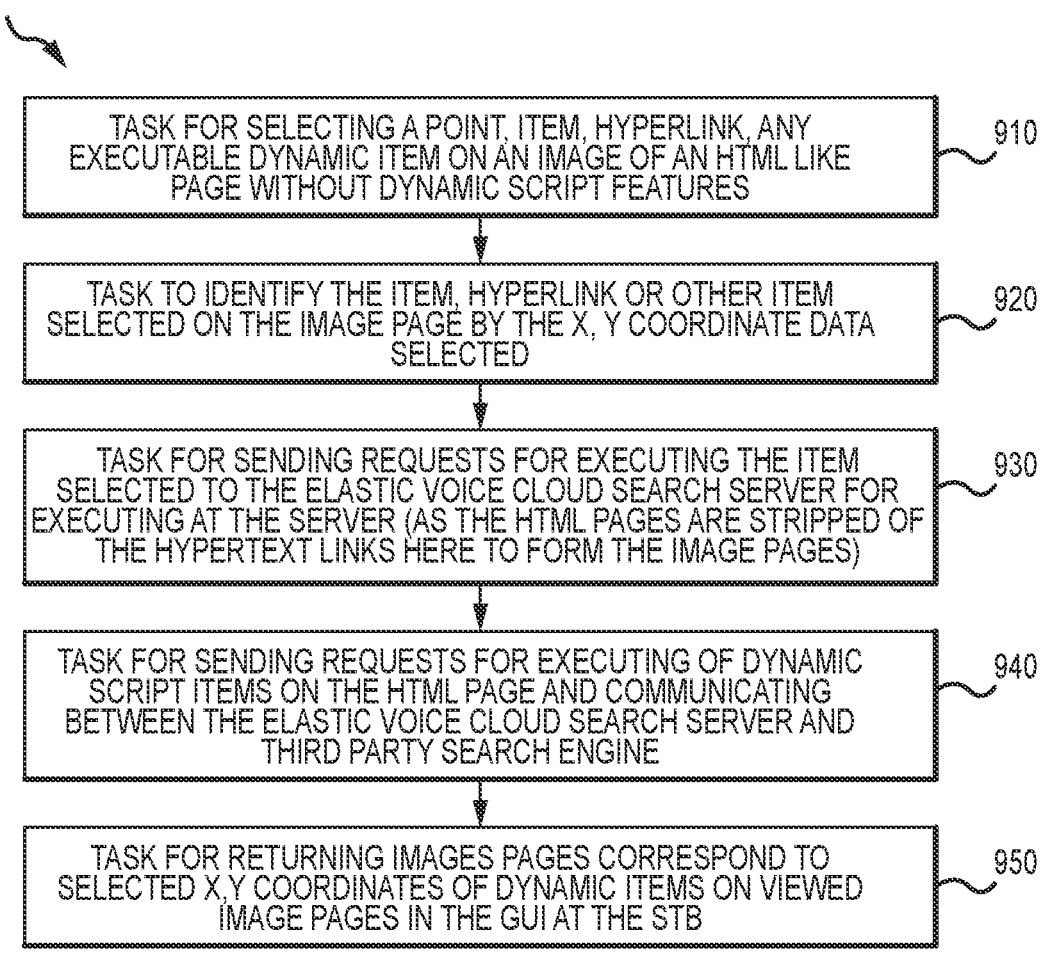

FIGS. 4A, and 4B are block diagrams of an example elastic cloud voice system for converting voice to text and search and performing an elastic search for a relevant channel, program and content data in response to voice input from the user;

FIG. 5 is a flowchart of an example process executable by an elastic voice cloud search server system for converting voice to text and search and performing an elastic search for a relevant channel, program and content data in response to voice input from the user;

FIG. 6 is a diagram of an example elastic cloud voice system for converting voice to text and search and performing an elastic search for a relevant channel, program and content data with a third-party search provider in response to voice input from the user;

FIG. 7 is a flowchart of an example process executable by an elastic voice cloud search server system for converting voice to text and search and performing an elastic search for a relevant channel, program and content data with a third-party search provider in response to voice input from the user;

FIG. 8 is a diagram of an example elastic cloud voice system for locating content on a display and requesting relevant content from a third-party search provider in response to the located content on the display; and FIG. 9 is a flowchart of an example elastic cloud voice system for locating content on a display and requesting relevant content from a third-party search provider in response to the located content on the display.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a set-top box (STB) or other television receiver device provides an integrated content management service (ICMS) that focuses on particular television programs that are available, rather than the content or related data for channels, networks or other sources of programming. The viewer selects a program for viewing and then surfs an EPG to find a particular channel or program. The STB obtains the selected program from whatever source may be available to the STB, including broadcast sources (e.g., cable, DBS, terrestrial broadcasts), stored content (e.g., content stored in a DVR), content available from video on demand (VOD) services, and/or any other sources of programming as appropriate. Various embodiments, therefore, allow the viewer to focus on the programming content itself rather than the source of the programming.

It is desirable, in various exemplary embodiments, to implement an elastic cloud voice search that enables voice interaction by a user with a STB or receiver directly or via a remote device to query for and select channels, program and other content that is desirable to the user from a plethora of an elastic number of sources and not limited to the sources available to the STB.

It is desirable, in various exemplary embodiments, to implement with the elastic voice cloud search, other voice to text services that include Natural Language Processing (NLP) services and Natural Language Understanding (NLU) service for enabling audio-to-text service that translates pulse PCM audio packages received from an STB (via a client or remote device connected to the STB) to text, and send the text to a requester cloud server or the like and so forth to multiple next services.

It is desirable, in various exemplary embodiments to implement with the elastic voice cloud search, a cloud service that accepts text and returns search results from various search sources that are not directly available to the STB as well available sources to the STB.

It is desirable, in various exemplary embodiments, to modify and enhance in different ways the general program and channel-centric approach to channel and program selection via a remote device connected to the STB or other receiver devices, and many of these options are described herein.

Figure 1:
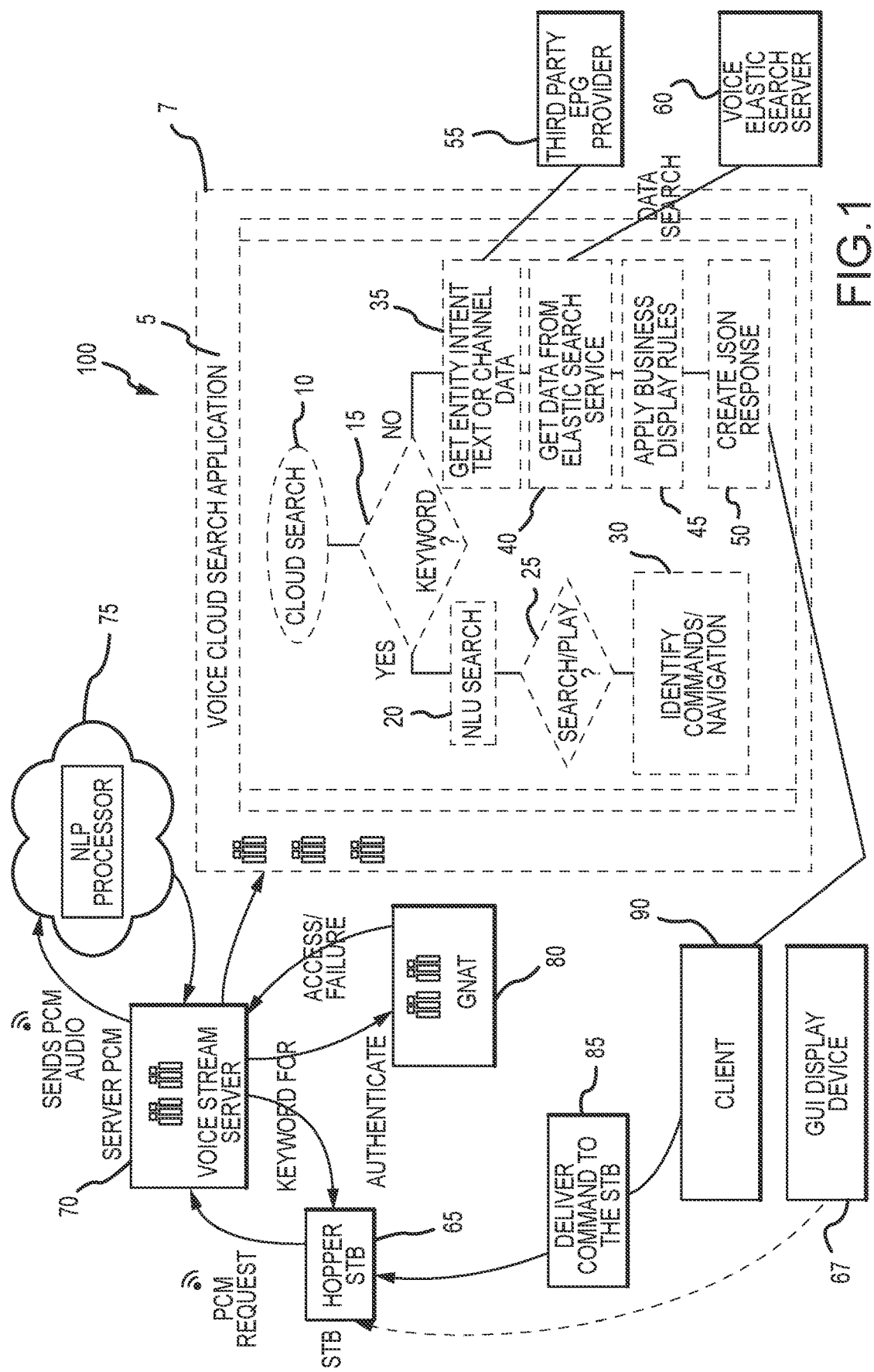

Turning now to the drawing figures and with initial reference to FIG. 1, an example of an elastic voice search service 100 for STB box clients. The elastic voice search service contains two sub-services, the first service is an audio-to-text service that translates PCM audio package to text and then sends the text to the requester, and so forth (i.e., propagating to the next connected service(s)). The second service is a search service that accepts text and returns the search results.

In addition, the second service is configured with a search criteria service which can apply a determined or a structured search criterion to search to a resultant search service. Hence, by separating text from the PCM audio package, the audio-to-text process extracts from the PCM audio package text for use by the search service which can be given other search criteria to guide, limit, or enhance query operations of the search service to enable the best or most relevant results by real-time voice communication of the user, to be presented to the user.

The voice cloud search service operates as an elastic voice search service 100 that receives and sends PCM audio package requests from the STB 65 to a PCM server 70 and in response to the PCM audio package requests; the STB 65 after the requests are processed by PCM server 70 to receive keywords for display. The PCM audio stream is sent to a PCM server 70 which in turn sends the PCM stream to a third-party NLP process server 75 for parsing and semantic recognition of the streamed PCM audio packets. The NLP process server 75 returns the recognized text from the NLP processing of the audio packets and sends the accepted or recognized PCM audio packages as a text set for further search processing the cloud. In cases, were the results can be considered expected, for example connecting to another source, changing to a particular, the results are returned to the user or viewer as the expected result. The recipient service (i.e., the third-party automated speech recognition service) is hosted on a separate server and could be any one of a plethora of such NLP solutions available on the market. For example, NUANCE® ASR or GOOGLE® ASR Services can be implemented to translate the PCM audio packages to texts. If the ASR service fails, then an error code can be generated, and a corresponding error text would be sent to the voice display device 67 of the result. If a valid text (i.e., a recognized text) is returned from third-party NLP Service (i.e., at the NLP process server 75), the PCM server 70 (i.e. the recipient service) will issue or sent a text search request to voice cloud text search service 5, and return the voice display result with a text set to the user at a client device on a display device 67.

After the NLP process server 75 completes the voice recognition step and converts the voice (i.e., the PCM audio package) to text, a GNAT server 80 provides an additional level of security by an authentication framework of GNAT secure hash to authenticate the data packets streamed from the PCM server 70. GNAT is a free software compiler for the Ada (ex. Structured language) programming language which forms part of the GNU Compiler Collection (GCC) authorization service. As an example, the voice verifies authentication service implemented is a GNAT authorization service that validates a token posted by the client at the STB. The GNAT authorization returns an HTTP if authorization fails or in another situation that treats the authorization as a failure or treats the HTTP as validation or success.

The responsibility of GNAT authorization service (or other authorization services) is designed to cooperate with ASR service(s) by the NLP process server 75 that perform the NLP processing. The ASR service is triggered by JavaScript executed to extract text from the PCM audio package and to determine what the next step should be, return a result. The text extracted for sending as the voice display result is returned to the client (of the STB 65) only after the post search request has been performed by the voice cloud search application 5 triggered by a search text request script before returning any result.

The text or text set from the PCM server 70 is sent to the voice cloud search server 7 which hosts a voice cloud search application 5 (i.e., a virtual voice search application). The cloud search application 10 hosted on the voice cloud search server 7 performs a contextual and elastic search of any text or keywords received.

The contextual and elastic search includes. At step 15, a controller responsive to a voice text request that accepts a particular search text request for searching by the elastic cloud search service 60 asynchronizely. The cloud text search service can be configured to execute a translation service to translate or convert text to target text (i.e., a command) by a cloud search text translation mapping. In an exemplary embodiment, a text such as "start engine" can be mapped to a command such as "tune to channel EPSN." Also, the cloud text service can perform an NLU, which is called by an NLU search text request for the NLU Service 20. In parallel or at about a same time, a text database search service can also be called. The text database search and the NLU search can be performed in parallel.

The NLU Service 20 can be configured as service which directly translates text to an action operation and can be made part of the voice display results sent back to the STB 65. The database search can be configured to search a plurality of sources and also return any results as part of the voice display results. At step 35, the text of program or channel data is returned from an EPG provider's database by an entity-intent object using an EPG provider 55. In an exemplary embodiment, the EPG provider 55 is configured to be responsive to a search criterion generated by scripts hosted by the voice cloud search server 7. At step 40, the data from the elastic cloud search service 60 is received and used to create the JSON response at step 50 to the STB. At step 45, business rules for display of the data are applied. In addition, when creating the JSON response data from the modify command and navigation step 30 is also integrated to modify any command responses or navigation operations of the EPG presented to the viewer at the STB 65. After step 50, the voice display result is sent to the client 90. That is the constructed and return JSON response of the voice display result is sent to the client to deliver a command 85 to STB.

FIG. 2 illustrates and exemplary cloud voice search criteria in accordance with an embodiment. In FIG. 2, the cloud server 205 includes user-interface 210, voice module 215, and server 220. The cloud server 205 sends PCM audio captured by the cloud server 205 to a voice cloud search server 260, which is processed to send back voice text to the cloud server 205. The voice module 215, the user-interface 210, and the server 220 are configured to implement the user attributes for capturing and sending the PCM audio to the voice cloud search server 260. The PCM audio at the voice cloud search server 260 sends the PCM audio for processing by a third-party natural language processing service 255 that extracts the PCM audio and returns text to the voice cloud search server 260. The text is then sent to a connected client of an elastic voice cloud search server 280. The elastic voice cloud search server 280 is coupled to a third-party electronic program guide (EPG) service 275 to return EPG channel and program data related to the text generated by the elastic voice search server 280. In addition, and also in the case that no relevant program or channel data is returned, the text is sent to a search services client 285 for addition searching of NLU, VOD, and other databases. The relevant content discovered from the search services client 285 is a return to the elastic voice cloud search server 280. The relevant content from both the third-party electronic program guide (EPG) service 275 or the search services client 285 is hosted at the elastic voice cloud search server 280.

The search results along with error codes (e.g., codes to indicate that the voice PCM was not recognizable or in error) are sent to an authentication client 270 to authenticate the set-top box 230 to receive the search results and the error code. Once authenticated, the controller 235 receives the search results and the error code if any and instructs the server 240 to present the relevant content in the user-interface 245. Also, the controller is responsive to voice controls from the voice module 250. In addition, the voice module 250 may also send PCM audio to the voice to the voice cloud search server 260.

Figure 3A:
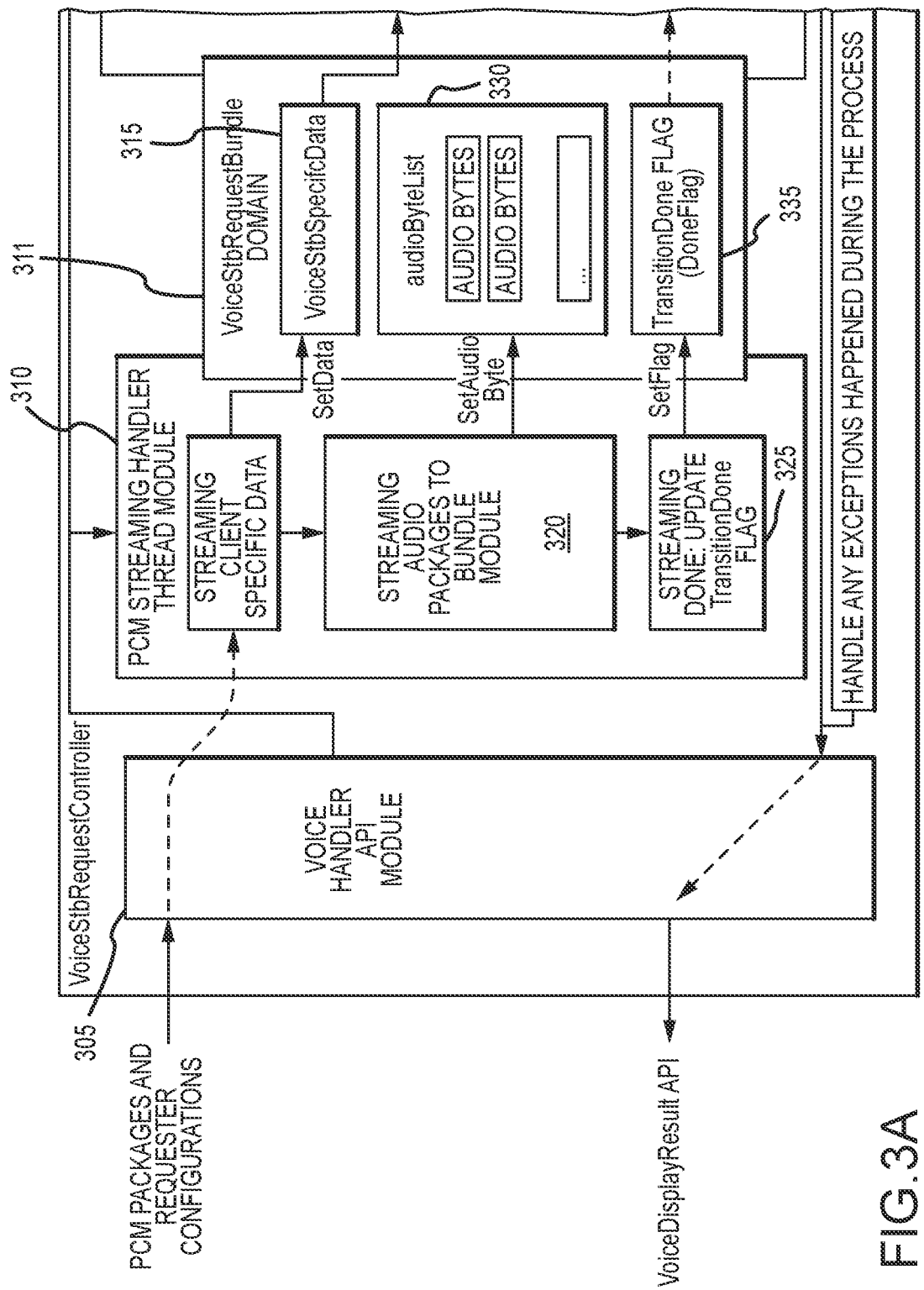
FIGS. 3A and 3B are block diagrams of an example elastic cloud voice system for converting voice to text and search and performing an elastic search for a relevant channel, program and content data in response to voice input from the user.
Figure 3B:
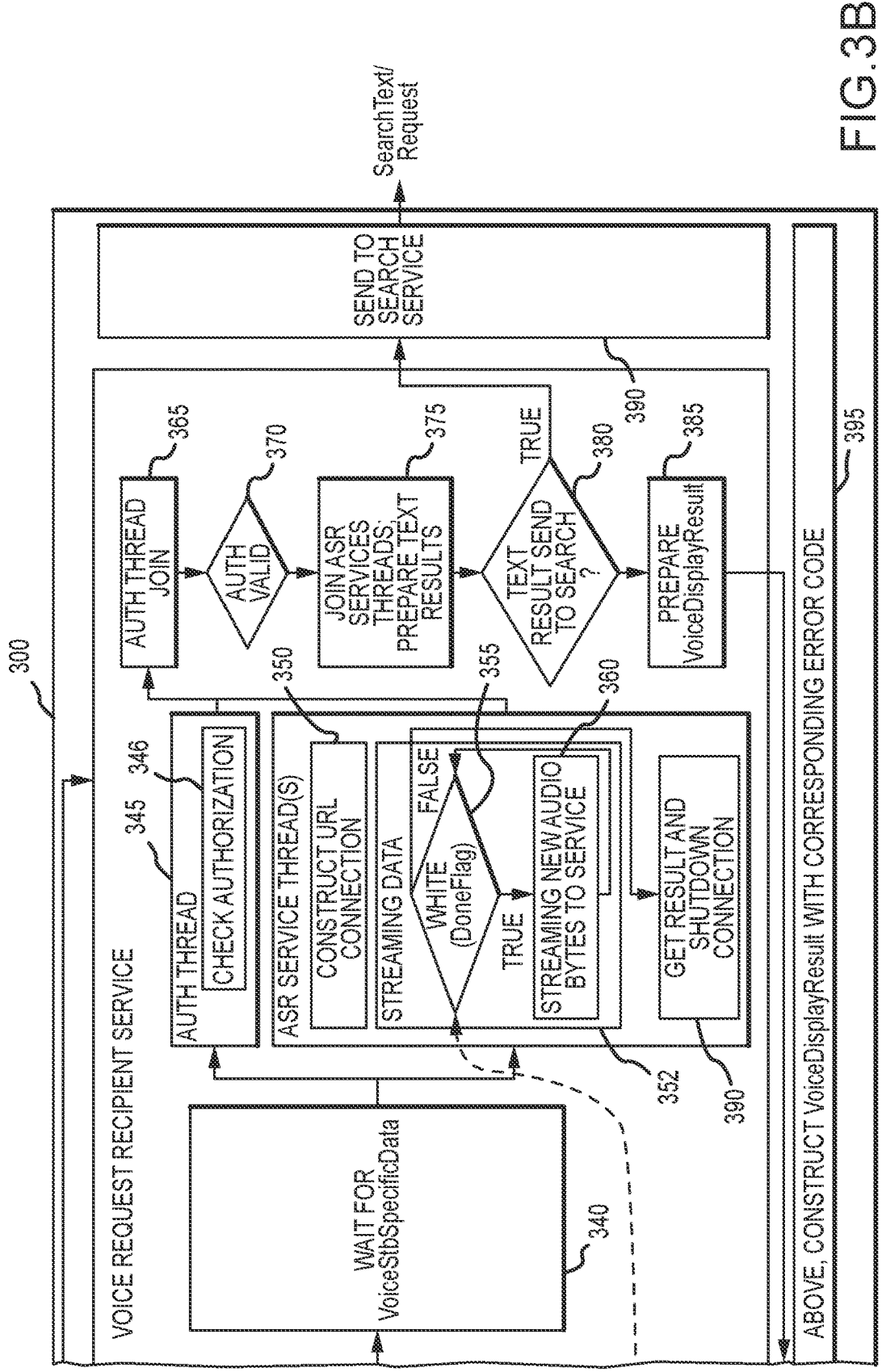

FIGS. 3A and 3B show an exemplary flowchart 300 of the audio to voice service in accordance with an embodiment. The voice cloud search service at a voice handler API module 305 receives requests from clients (STBs), which includes PCM binary packages and requester specific settings/configurations. Next, at a streaming handler thread module 310, a request streaming handler JavaScript is executed to parse the requests (i.e., a multi-form request) and also parse the buffered audio packages. The multi-form data contains two fields of audio parameters and request data. The audio parameter contains the audio binary data, and the requested data contains the client configuration. When a request is received, the controller will start the request streaming handler thread to handle the request payload and start the voice request recipient service. When the voice set-top box specific data is set at the voice set-top box specific module 315, a post client data ready service can be executed.

All the information posted by the client would be stored into a request bundle, of the PCM streaming handler thread module 310 where streaming audio packages are bundled by a streaming audio package to bundle module 320 and when completed an update transition done flag module 325 sends a transition flag that the operation is completed. While the handler thread receives the client configuration data, it needs to notify the request recipient service so as to let the request recipient service continue processing the request. The detail of Voice Request Recipient Service would be stated in the Voice Request Recipient Service section. Then the PCM streaming handler thread module 310 will buffer all the audio data into a bundle until the multiform payload terminates. At the end, the PCM streaming handler thread module 310 must set the flag to a "transition done" state, the services who are monitoring (i.e. transition done flag module 335) the flag of the update transition done flag module 325 receive notice that the audio packages are fully buffered, and there will be no more coming for this request of continuing processing audio bytes and insert into audio Byte List module 330 until the multiform payload terminated. The voice STB request bundle is a container for holding client posted data and information for logging.

The voice set-top request bundle contains three objects, voice binary audio data, audio Byte List and voice audio data for a non-streaming audio version; client STB posted data, Voice to STB specific data, and logging or session information.

Once, the PCM streaming handler thread module 310 sets the flag to the "transition done" state, the services which are monitoring this flag are executed as the audio packages are now fully buffered. Hence, the execution can occur in one step as there are no more requests in the pipeline. At module 340, module 340 is configured to wait for the voice set-top box specific data. Next, at authorization thread module 345, the authorization thread is created and started to check the authorization 346 for the PCM packages and requests. At the construct URL connection module 350, the URL connection is created for a third party NPL service (i.e., the ASR service threads are created) and started to the streaming data module 352 which integrates a feedback loop that determines by determination module 355 if the streaming requests are complete and then streams new audio bytes to the service at module 360, fetches the results and shuts down the connection to join the authorization thread 365 (i.e. the output from the authorization thread module 345). Here, the authorization is validated 370, the results are collected from all the automatic speech recognition (ASR) services 375, and the text results are sent 380 to the search service 390 and the voice display results are constructed and returned back to client 385. If any issues happen in steps above, then the exception handler module 395 sends corresponding error code back to the requester.

FIGS. 4A, and 4B are diagrams of the text search of the elastic voice cloud search service in accordance with an embodiment. The elastic voice cloud search text service 400 is constructed by multiple sub modules.

A voice text request controller 405 that receives the text and client configuration via a cloud search text request handler and responds with a request received the success that the text and client configuration has been successfully received. The voice text request controller 405 accepts the text request and starts the search service in a synchronized manner and creates a cloud search thread 410. The cloud text search service implements the cloud search thread to perform extendable services 420 such as a translation service translate text to target text (i.e., a Cloud Search Text Translation Mapping), for instance, a "start engine" is mapped to "tune to channel EPSN."

Then trigger the Natural-language understanding (NLU) service 425 and the Text Database Search 430 (i.e., a Cloud Search Text converted to a Database Search) in parallel. The NLU Service 425 is a contextual service that enables a direct translated text converted to action as part of the voice display result from the result assembling service 485. The database search can search in database sources (including databases connected in a multi-tenant shared server environment) and return voice display results via the error code module 500. The search service implements a Text to Search Criteria Service from the NLU service 425 (i.e., into Convert Text to a corresponding voice cloud server search criterion. In one instance, the converted text is converted to an entity-intent object for a third-party error code. Also, the EPG service performs a search of EPG program and programming data. This is performed with an assistant from a criteria creator service agent associated with the third-party EPG. Additional searches include: elastic search 440, channel search 445, DVR search 450, internet protocol (IP) video on demand (VOD) search 455, Free Video on Demand (FVOD) search 460 and other services 465 (e.g. subscription video on demand (SVOD), pay per view (PPV), advertising video on demand (AVOD), transactional video on demand (TVOD), etc.). A merge and filter module 470 create a summary derived from the Cloud Search Request Info of a Search Criteria, a brief of what is searched for, and what filters/restrictions use wants to apply for the search. This summary can be used for configuring the processing steps of the merge and filter module 470 of a merge, a sort, and a resultant assembly.

Additionally, at merge and filter module 470, can prepare and merge the input object using a mapping search input script of the multiple Database Search Sources Services, which returns the merge input objects as a Source Data Procurement Service object which include: (a) Channel Search (Channel search Service), (b) DVR Search, (c) Elastic Server Search (e.g. an Elastic Search Service), (d) IP VOD Search, (e) FVOD Search, and (f) Extendable Search services.

The merge service is a service that merges the results from all the sources, remove duplications, set attributes and returns result lists, for example from a set of lists for each result type, like actor, team, movie and so on. Also, a "TODO" module can filter out "invalid" candidates by client Configurations and request summaries.

A sort service of a sort configuration 480 and sort process 475, a service accepts result lists and sort all the lists based on the client configuration and request summarization.

The result assembling service 485 is a service implementing a set of action rules and display assembling rules from an action rule and display assembling rules module 490 utilizes sorted result lists, client configuration, and request summarization to construct the voice display result. The constructing process includes: Step (a) to construct an action block of the voice display result, (b) if no action block is constructed then to proceed to step (b) to create a display list based on the request summarization. If no elements are inserted into the display list created then to select the best candidates to be inserted by using an autosuggest function (i.e., a script or string to autosuggest candidates).

Next, if the NLU service returns a valid action in the voice display result, then the database search is stopped and the result and error code module 500 sends the search results and the error code to the requester. Otherwise, if the NLU service does not return a valid action in the voice display results, the result and error code module 500 waits for results from the database search service. The wait time can be pre-configured for a certain period if necessary. Once, the results are received by the requestor; then the voice display results are sent to the client. If any excepts occur 510 in the processing flow, then a dummy voice display is sent to the client with error codes to present or display by the client.

Other program sources (including other network services, wireless streaming services, and/or other media sources not yet implemented) could be additionally considered, as desired.

FIG. 5 is a flowchart of an example process 515 executables by an elastic voice cloud search server system for converting voice to text and search and performing an elastic search for a relevant channel, program and content data in response to voice input from the user.

At task 520, a PCM audio package is generated by the STB and sent to the cloud server, which is in communication with the STB. The cloud server sends the PCM audio package captured to a voice cloud search server which is processed to send back as voice text to the cloud server. At task 525, the PCM audio at the voice cloud search server sends the PCM audio for processing by a third-party natural language processing service that extracts the PCM audio and returns text to the voice cloud search server. At task 530, the PCM audio package is authenticated for the particular client or requestor from which it was sent (i.e., the STB, etc.). At task 540, the text is then sent to a connected client of an elastic voice cloud search server. The elastic voice cloud search server is coupled to a third-party electronic program guide (EPG) service to return the EPG channel and program data related to the text generated by the elastic voice search server. At task 550, the querying of the program and channel data using a third-party EPG service provider and at task 560, using a search service for querying other sources for video, image, and related content.

In addition, if no relevant program or channel data is returned, the text is sent to a search services client searches for addition searching of NLU, VOD, and other databases. The relevant content discovered from the search services client is a return to the elastic voice cloud search server. At task 570, the relevant content from both the third-party electronic program guide (EPG) service or the search services client 285 is hosted at the elastic voice cloud search server.

At task 580, the search results along with error codes (e.g., codes to indicate that the voice PCM was not recognizable or in error) are sent to an authentication client to authenticate the set-top box to receive the search results and the error code. Once authenticated, the controller receives the search results and the error code if any and instructs the server at task 590 to present the relevant content in the user-interface or to the requestor or client.

FIG. 6 illustrates and exemplary cloud voice search with an elastic voice cloud search service using a third-party search service in accordance with an embodiment. In FIG. 6, the cloud server 605 includes user-interface 610, voice module 615, and server 620. The cloud server 605 sends PCM audio captured by the cloud server 605 to a voice cloud search server 660, which is processed to send back voice text to the cloud server 605. The voice module 615, the user-interface 610, and the server 620 are configured to implement the user attributes for capturing and sending the PCM audio to the voice cloud search server 660. The PCM audio at the voice cloud search server 660 sends the PCM audio for processing by a third-party natural language processing service 655 that extracts the PCM audio and returns text to the voice cloud search server 660. The text is then sent to a connected client of an elastic voice cloud search server 680. The elastic voice cloud search server 680 is coupled to a third-party electronic program guide (EPG) service 675 to return EPG channel and program data related to the text generated by the elastic voice search server 680.

The elastic voice cloud search server 680 is also connected to a third-party search service 685. In an exemplary embodiment, the third-party search service can be MICROSOFT® BING®, GOOGLE®, WIKI.COM®, TWITTER®, YANDEX®, BAIDU® etc . . . . That is the elastic voice cloud search server 680 can be configured with appropriate APIs to access one or more different third-party search services 685 to request and retrieve content related to the requests for the voice cloud search server 660.

In addition, when there is no relevant program or channel data is returned, the text is sent to can be sent to a search services client 685 for additional searching. In various exemplary embodiments, prior to sending the text, similar or related text or phrases may also be sent or the text itself can be augmented prior to sending to the third party elastic voice cloud search server 680 by artificial intelligence or machine learning applications hosted by the elastic voice The relevant content discovered from the search services client 285 is returned to the elastic voice cloud search server 680. The relevant content from both the third-party electronic program guide (EPG) service 675 or the search services client 685 is hosted at the elastic voice cloud search server 680.

In an exemplary embodiment, a request is sent from the elastic voice cloud search server 680 is sent first to the EPG service 675. Either a response is generated by the EPG service 675 that can include results of either or both of program and channel data that is relevant or related to the request or a response that indicates that no results can be found. Either if there is relevant program and/or channel data returned by the EPG service 675 or there are no results returned, the elastic voice cloud search server 680 can be configured to send another different request or set of requests to the EPG service 675 to find relevant program and channel data. Additionally, the elastic voice cloud service 680 can be configured to send a request to the third-party search service 685. In an exemplary embodiment, the third-party search service 685 will inform the elastic voice cloud search service 680 if the search service can in response to the request send a result. Hence, the elastic voice cloud search service 680 will know to wait for a result. The third-party search service 685 will send either the most relevant result or a set of results. In either case, the elastic voice cloud search service 680 will confirm receipt of the result and then proceed to process the results or make additional requests. In an exemplary embodiment, the third-party search service 685 can send one or more requests by the elastic voice cloud search server to a third-party search service 685 where the third-party search service independently performs search applications to determine a set of relevant search results that can include HTML pages and the HTML pages can have one or more hypertext links pointing to image and video content to serve up at the STB 630. The elastic voice search server 680 can extract the image and video content by navigating the hypertext links in the HTML pages to identify relevant image and video content. The elastic voice cloud search server 685 can strip the image and video data and remove any associated dynamic scripts in the HTML page. This enables a set of results to be returned to the STB 630 of the raw video, image data or text data to be reconfigured and presented in a GUI at the STB 630. This process can strip or block any viruses from infecting the STB 630 and remain only at the elastic voice cloud search server 680. Therefore, anti-virus software is not needed to be licensed or used for operating the STB 630 saving costs and preventing any corruption of the image and video data stored at the STB 630.

In an exemplary embodiment, the elastic voice cloud search service 680 may provide the results as images or video to the user at the STB 630 via the client authentication element 670. In this case, the STB 630 may provide additional requests from the user with respect to the results via PCM audio to the voice cloud search server 660. The voice cloud search server 660 in turn can provide more feedback in the form of text to the client for processing by the elastic voice cloud search service 680 and further communicating to the third-party search service 685 for further searching for relevant results based on the additional voice input. In other words, a feedback process is created between the STB 630 and the various servers and search services to analyze and process each additional voice input and to further search or quantify results received.

The elastic voice cloud search service 680 may reformat or reconfigure the results received from the third party search service 685 with the results from the EPG service 675 to create a digest or grouping of the results and send the digest or grouping along with requisite error codes if any to the client authentication element 670 for authentication and security prior to results received by the STB 630. In this way, actual dynamic scripts in results from the third-party search service 685 are not shared with the STB 630 to prevent viruses or malware from intruding into the STB 630 ecosystem. In other words, viruses or malware intrusions are limited to the cloud elements of the elastic voice cloud search service 680 and cannot penetrate further to the other servers and agents that are directly in communication with the STB 630. Moreover, the elastic voice cloud search service 680 can be configured with parental controls and privacy controls as desired by the user of the STB 630 to filter results (i.e. content) that are not desired by the user.

The search results along with error codes (e.g., codes to indicate that the voice PCM was not recognizable or in error) are sent to an authentication client 670 to authenticate the set-top box 630 to receive the search results and the error code. Once authenticated, the controller 635 receives the search results and the error code if any and instructs the server 640 to present the relevant content in the user-interface 645. In the case of the results from the third party search service 685, the HTML pages received are stripped of hypertext links at the server (i.e. the elastic voice cloud search service 680) or any other dynamic scripts, and received as image files (i.e. JPEG, GIF, PNG, TIFF etc.) so that no dynamic add-ons, links, Java Scripts are included from the search results and can be executed by the user.

The STB 630 has a controller 635 which is responsive to voice controls from the voice module 650. In addition, the voice module 650 may also send PCM audio to the voice to the voice cloud search server 660.

FIG. 7 is a flowchart of an example process executable by an elastic voice cloud search server system for converting voice to text and search and performing an elastic search for a relevant channel, program and content data with a third-party search provider in response to voice input from the user. At task 705, a PCM audio package is generated by the STB and sent to the cloud server, which is in communication with the STB. The cloud server sends the PCM audio package captured to a voice cloud search server which is processed to send back as voice text to the cloud server. At task 710, the PCM audio at the voice cloud search server sends the PCM audio for processing by a third-party natural language processing service that extracts the PCM audio and returns text to the voice cloud search server. At task 715, the PCM audio package is authenticated for the particular client or requestor from which it was sent (i.e., the STB, etc.). At task 720, the text is then sent to a connected client of an elastic voice cloud search server. The elastic voice cloud search server is coupled to a third-party electronic program guide (EPG) service to return the EPG channel and program data related to the text generated by the elastic voice search server. At task 730, the querying of the program and channel data using a third-party EPG service provider.

At task 740, the elastic voice cloud search service may send a request to a third-party search service to get relevant content results. For example, the communication may involve a series of back and forth communications confirming receipts of results or sending more results in response to the original requests by the third-party search service. In other words, the third-party search service will independently assess the requests and provide feedback as to the results or related results in response. The response from the third-party search service may instances be listings of hypertext links on an HTML page, HTML pages, image files, MPEG files, raw image and video, combinations of image and video, social network pages and posts, etc. . . . . In other words, the search provider may be able to serve up any relevant results that the search provider deems appropriate within the context of the agreement made between the search service and the elastic voice search cloud ecosystem, STB providers, or operators. At task 750, in an exemplary embodiment, the resultant image and video files may be stripped of all dynamic component parts on the HTML page and reconfigured as static images or raw video for sending to the STB with any channel or program data received from the EPG provider service. The image, content and video will be hosted at servers of the cloud voice search service.

In an exemplary embodiment, the elastic voice cloud search server can be instructed to wait for an affirmative or a declination sent from the search service. For example, in response to the declination to a particular request, additional related requests to the search service can be sent by the elastic cloud search server in an attempt to receive related search results to serve up in a graphic user interface associated with the STB to a requester. Also, if no results are received or the response is a declination to the request then an error code is sent to the STB.

At task 750, the elastic voice cloud search service may reformat or reconfigure the results received from the third party search service with the results from the EPG service to create a digest or grouping of the results and send the digest or grouping along with requisite error codes if any to a client authentication element for authentication and security prior to results received by the STB. In this way, actual dynamic scripts in results from the third-party search service are not sent on to the STB and this can prevent viruses or malware from intruding or propagating to the STB ecosystem at the client. In other words, the elastic voice search service stripping processes act like a firewall preventing viruses or malware from corrupting the software at the client and realize a more stable client voice system. Also, the elastic voice cloud search service can be configured with parental controls and privacy controls as desired by the user of the STB to filter results (i.e. content) that are not desired by the user.

At task 760, the search results along with error codes (e.g., codes to indicate that the voice PCM was not recognizable or in error) are sent to an authentication client to authenticate the set-top box to receive the search results and the error code. Once authenticated, the controller receives the search results and the error code if any and instructs the server to present the relevant content in the user-interface. In the case of the results from the third party search service, the HTML pages received are stripped of hypertext links at the server (i.e. the elastic voice cloud search service) or any other dynamic scripts, and received as image files (i.e. JPEG, GIF, PNG, TIFF etc.) so that no dynamic add-ons, links, Java Scripts are included from the search results and can be executed by the user.

At task 770, the STB with the integrated controller is configured to be responsive to voice controls from the voice module in the STB and to present the results in a GUI at the STB that has voice responsive functionality for showing the results and for navigating sets of results. The voice module may also send PCM audio packets to the voice cloud search service from the user in response to viewing the results in the GUI for getting more results or for changing the results. This enables a feedback process for the user to continuously or dynamically change the results that are displayed to the user at the STB.

FIG. 8 is a diagram of an example elastic cloud voice system for locating content on a display page and requesting relevant content from a third-party search provider in response the located content on the display. In FIG. 8, in an image page 811 generated from an HTML page or the like from a third party search service 845, display in a graphic user interface (GUI) 820 generated from a server 815 responsive to control commands from a controller 810 in communication with a STB 805, where the user selects an area, element, displayed image of a hyperlink or other dynamic plugin located on the image page 811. The user can use the input 825 which can be configured to receive voice, touch, or visual inputs directly or indirectly using smart glasses, smart phones or smart remote devices or the like. The input device 825 identifying by the user actions of a selection in at a point, portion or part of the image page 811, a plethora of items that can include an image of a hyperlink, an image button to execute a feature on the image page 811, or like portion that is customary associated with input on a HTML page generated by a search engine. The input device 825 by the user action generating at least x and y coordinates that can be synced to various image items on the image page 811 for execution at the elastic voice cloud search service server (EVCSSS) 840. That is, the user can select a particular point on the image page 811 and the x and y coordinate data are sent to the cloud search voice server 830. At the cloud search voice server 830, the x and y coordinates are converted to a command in an example, to execute a hypertext link on the HTML page that was generated by the third-party search service 845. The EVCSSS can receive text of the command for execution of the hyperlink and then execute the hyperlink on a copy of the image page 811 which is stored as an HTML page at the EVCSSS 840. In turn, the hyperlink on the HTML page may call additional page data from the third-party search service 845. In this way, the user can actuate items on image page 811 that looks and feels like an HTML page without the dynamic script of the HTML page residing at the STB 805. The executions of the dynamic script or other items takes place at the EVCSSS 840 and not at the STB 805. The x and y coordinate data send to the cloud voice search server 830 is matched to the HTML page item or converted to a command and sent to the EVCSSS 840 for execution with the third-party search service 845.

FIG. 9 is a flowchart of an example elastic cloud voice system for locating content on a display and requesting relevant content from a third-party search provider in response the located content on the display. At task 910, the user using the input device selects a point, item, or other feature on an image of an HTML page displayed by the STB in GUI. That is, at task 920, the user viewing the page uses the input device to voice the execution of an item, manually select an item or uses a smart phone or wearable device to send an input that identifies an item or point on the image. The item for selection or hyperlink item is identified by x and y coordinate data that the user chooses on the image of the HTML page.

Once selected, then at task 930, the x and y coordinate input are received by the cloud voice search server for coordinating to a command, a selection of a hyperlink item or for that matter any item or feature including navigation icons, tabs etc. on the image of the HTML page. The cloud voice search server, in one instance, may receive voice input data that is converted to command text by a third-party NLP service. Once the command, hyperlink, or other item is identified, then at task 930, the request is sent to the elastic voice cloud search server. In an exemplary embodiment, the elastic voice cloud search server may host HTML pages with active controls, hyperlinks etc. For example, the elastic voice cloud search server may receive from the third-party search service a list of HTML pages, of linked list of HTML pages by hyperlinks that are stored at the elastic voice cloud search server and served up in response to user input requests at the STB. At task 940, the elastic voice cloud search server sends requests received for executing the hyperlinks or the like on the HTML page stored at the elastic voice cloud search server. The HTML page stored at the elastic voice cloud search server corresponds to the image of the HTML page sent and displayed in the GUI at the STB.

Next, at task 950, the corresponding image is generated of the selected HTML hyperlink page by the elastic voice cloud search server and sent after an authentication step to the STB for viewing by the user in the STB. In this way, the user is able to navigate hyperlinks or execute items on an image of an HTML page without having to store the HTML locally at the STB. Further, the user by the sending of corresponding x and y coordinate location data to the server, enables the user to be given the impression that the image of the HTML page is actually a dynamic HTML page. In other words, the user experience of navigating HTML pages locally by the user is not diminished as the input device used by the user will give the user the impression that the user is directly actuating hyperlinks on the HTML page when in fact, the user is not and the execution of the hyperlinks is taking place remotely from where the input is received at the STB. This process enables a clear demarcation between where image pages or image is stored locally and where dynamic script features and hyperlinks are allowed to propagate; which is only in the cloud server and not locally at the STB.

While the above implementation describes using coordinate location data, in other exemplary embodiment, voice communications of features on the image page may be converted by the elastic voice server to links in corresponding HTML pages by text correspondence to the feature or hypertext link in the HTML page. The image of the HTML can then be served up at the client device i.e. the STB in a similar manner.

The foregoing discussion, therefore, presents systems, devices, and processes to create a "content-centric" experience that focuses on the program, channel, and related data content instead of the source of the content. Rather than forcing viewers to separately consider content from each unique source that may be available, various embodiments allow viewers to perform a voice search of a combined program directory with search result content and to retrieve not only programs, but related content based upon the subject matter of the program itself providing a richer user experience.

The term "exemplary" is used herein to represent one example, instance or illustration that may have any number of alternates. Any implementation described herein as "exemplary" is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a search server that communicates with a set top box (STB) via a network, the automated process comprising:
   receiving, from the STB via the network, a voice request that comprises audio data;
   processing the audio data by the search server to create a first image page for viewing by a user of the STB, wherein the processing comprises stripping dynamic scripts from the first image page, wherein stripping dynamic scripts from the first image page includes removing all hyperlinks from the first image page;
   transmitting the first image page created by the search server to the STB via the network;
   receiving, from the STB by the search server, a selection of a feature from the first image page, wherein the selection is created by the STB in response to a user input identifying a location of the feature on the first image page;
   identifying, by the search server, the feature based on the identified location of the feature on the first image page;
   executing, by the search server, a feature request for a linked page corresponding to the identified feature; and
   stripping, by the search server, dynamic scripts from the linked page to generate a second image page of the linked page for display at the STB,
      wherein stripping dynamic scripts from the linked page includes removing all hyperlinks from the linked page, and
      wherein stripping dynamic scripts from the linked page further comprises converting removed dynamic scripts and hyperlinks to image items, wherein each image item is synced to x and y coordinates on the linked page.

2. The automated process of claim 1, wherein the identified feature has an appearance of a dynamic feature when viewed by the user.

3. The automated process of claim 1, further comprising receiving the linked page at the search server from a third-party search service in response to executing the feature request.

4. The automated process of claim 3, further comprising:
   executing, by the search server, a second feature request for a second linked page corresponding to a second identified feature; and
   waiting, by the search server, for a confirmation or a declination from the third-party search service in response to the second feature request.

5. The automated process of claim 4, further comprising sending a third feature request to the third-party search service in response to the declination of the second feature request, wherein the third feature request is related to, but different from, the second feature request.

6. The automated process of claim 4, further comprising sending an error code to the STB in response to the declination of the second feature request.

7. The automated process of claim 1, wherein the image page is a hypertext-markup-language (HTML) page without hyperlinks.

8. An elastic cloud server configured to conduct searches based on voice requests received from a client device over a network, wherein the elastic cloud server is configured to perform an automated process comprising:
   receiving a voice request from the client device, wherein the voice request comprises audio data;
   receiving a first image page from the client device, wherein the first image page is a non-dynamic page, and wherein the image page does not contain dynamic scripts and does not contain hyperlinks;
   receiving a request from the client device for a feature identified on the first image page, wherein the feature has an appearance of a dynamic feature when displayed, wherein the request includes a location of the feature on the first image page;
   identifying the feature by the location of the feature on the first image page;
   executing a first feature request using a dynamic script to receive a linked page from a third-party search service, wherein the dynamic script was stripped from a dynamic page to generate the first image page; and
   generating a second image page for display by the client device by stripping all dynamic scripts from the linked page,
      wherein stripping all dynamic scripts from the linked page includes removing all hyperlinks from the linked page, and
      wherein stripping all dynamic scripts from the linked page further comprises converting the removed dynamic scripts and hyperlinks to image items, wherein each image item is synced to x and y coordinates on the linked page.

9. The elastic cloud server of claim 8, wherein the automated process further comprises receiving the linked page from the third-party search service in response to execution of the first feature request.

10. The elastic cloud server of claim 8, wherein the automated process further comprises waiting for an affirm response or a decline response from the third-party search service in response to the first feature request.

11. The elastic cloud server of claim 10, wherein the automated process further comprises sending a second feature request to the third-party search service in response to the decline response to the first feature request, wherein the second feature request is related to, but different from, the first feature request.

12. The elastic cloud server of claim 10, wherein the automated process further comprises sending an error code to the client device in response to receiving the decline response to the first feature request.

13. The elastic cloud server of claim 8, wherein the automated process further comprises authenticating the client device for receipt of the first image page before the client device displays the first image page.

14. The elastic cloud server of claim 8, wherein the first image page comprises a hypertext-markup-language (HTML) page without hyperlinks.

15. A method for implementing voice searches using a search server to receive the voice searches from client devices, the search server in communication with a search service for retrieving information related to the voice searches, the method comprising:
   receiving, at the search server and from a client device, a user request including a feature request corresponding to a feature on a first image page;
   creating, by the search server, a cloud search thread for sending the feature request to the search service;
   generating, by the search server, a set of results from the search service, wherein the set of results comprises a second image page that includes content responsive to the feature request, wherein the content is extracted by navigating a dynamic link from a dynamic page to the content responsive to the feature request;

stripping, by the search server, all dynamic scripts from the second image page, wherein stripping all dynamic scripts includes removing all hyperlinks from the second image page;

sorting, by the search server, the set of results from the search service into a list of links based on the user request; and assembling, at the search server, the list of links into actions for insertion into a user request list responsive to the user request, wherein the actions comprise action blocks, wherein stripping all dynamic scripts from the second image page further comprises converting removed dynamic scripts and hyperlinks to image items, wherein each image item is synced to x and y coordinates on the second image page.

16. The method of claim 15, further comprising receiving a linked page at the search server in response to a second feature request sent by the search server to the search service.

17. The method of claim 16, further comprising converting, by the search server, the linked page to a third image page by stripping a dynamic script from the linked page, wherein the dynamic script comprises a hyperlink contained in the linked page.

18. The method of claim 15, further comprising instructing the search server to wait for an affirm response or a decline response from the search service in response to the feature request sent to the search service.

* * * * *